United States Patent [19]

Okamoto

[11] Patent Number: 5,351,774
[45] Date of Patent: Oct. 4, 1994

[54] POWERED WHEELCHAIR WITH A DETACHABLE POWER DRIVE ASSEMBLY

[75] Inventor: James Okamoto, Clovis, Calif.

[73] Assignee: Quickie Designs Inc., Fresno, Calif.

[21] Appl. No.: 892,276

[22] Filed: Jun. 2, 1992

[51] Int. Cl.⁵ ............................................. B60K 1/02
[52] U.S. Cl. ..................... 180/65.1; 180/11;
180/907; 267/41; 267/47; 267/229; 280/250.1;
280/304.1; 280/699; 280/721
[58] Field of Search .................. 180/907, 65.1, 11;
280/250.1, 304.1, 30, 699, 700, 718, 721; 188/2
F; 403/381; 267/229, 165, 158, 262, 46, 45, 43, 41

[56] References Cited

U.S. PATENT DOCUMENTS

| | | | |
|---|---|---|---|
| 2,448,992 | 9/1948 | Love et al. | 180/907 |
| 2,495,573 | 1/1950 | Duke | 180/907 |
| 3,100,547 | 8/1963 | Rosenthal | 180/907 |
| 4,341,278 | 7/1982 | Meyer | 180/79.1 |
| 4,386,672 | 6/1983 | Coker | 180/13 |
| 4,475,613 | 10/1984 | Walker | 180/907 |
| 4,570,756 | 2/1986 | Minnebraker et al. | 188/2 F |
| 4,643,446 | 2/1987 | Murphy et al. | 180/907 |
| 4,721,321 | 1/1988 | Haury et al. | 280/250.1 |
| 4,805,712 | 2/1989 | Singleton | 180/65.1 |
| 4,961,473 | 10/1990 | Jones | 180/65.1 |
| 4,967,864 | 11/1990 | Boyer et al. | 180/65.1 |
| 5,016,720 | 5/1991 | Coker | 74/105 |
| 5,022,476 | 6/1991 | Weege | 180/6.5 |
| 5,135,063 | 8/1992 | Kropf | 180/907 |

Primary Examiner—Eric Culbreth
Attorney, Agent, or Firm—Flehr, Hohbach, Test, Albritton & Herbert

[57] ABSTRACT

A wheelchair (20) including a wheelchair frame (22) and a seat assembly (24) carried by the wheelchair frame (22). A detachable power drive assembly (32) having power driven wheels (40, 40') is releasably coupled to the wheelchair frame (22) and is mounted for selective removal of the drive assembly (32) as a unit from the wheelchair frame (22). Wheel mounting ports (76, 76') are also provided in the wheelchair frame (22) for releasably receiving a pair of manually-operable drive wheels (34, 34'). An anti-tip suspension (80) is also provided and includes a suspension arm (84) which is mounted to resist rearward tipping of the wheelchair by a non-linear restoring force. A wheel lock (108) is mounted for movement between a deployed operable position and a stored inoperable position. In the deployed position, the wheel lock (108) extends laterally outwardly of the wheelchair frame (22) for engagement with and braking of manually operable drive wheels (34, 34').

12 Claims, 7 Drawing Sheets

POWERED WHEELCHAIR WITH A DETACHABLE POWER DRIVE ASSEMBLY

TECHNICAL FIELD

The present invention relates, generally, to wheelchairs and, more particularly, to wheelchairs including power drive assemblies.

BACKGROUND ART

Wheelchairs have been primarily designed to provide transportation for the physically impaired, often emphasizing user comfort, portability and flexibility. Because of the individual needs and requirements of the wheelchair occupants, however, a variety of styles and shapes have been developed which cater to their specific needs. Moreover, most of these styles and shapes include power driven counterparts which, of course, are highly desirable.

Powered wheelchairs generally include an electric powered drive assembly having a drive assembly support structure which forms an integral portion of a wheelchair support frame. Typically, the drive assembly includes an electric motor and battery, each of which are generally mounted to the drive assembly support structure. At least two power driven wheels, supported by the wheelchair support frame, are rotatably coupled to the motor and engage the ground to propel the wheelchair. Furthermore, the wheelchair support frame carries a seat support assembly including a seat and a backrest. The drive assembly is usually operably coupled to a joystick which permits the user to control the direction of travel of the powered wheelchair from the user operational position.

While powered wheelchairs are highly advantageous in many situations, manually propelled or operated wheelchairs also can have many advantages. Moreover, if the drive assembly of a powered wheelchair should malfunction, for whatever cause, the wheelchair occupant may be left without a functional wheelchair for the duration of the repair period. Usually, the motor and/or batteries are individually mounted to the drive assembly support structure which, in turn, is integrally mounted to the wheelchair support frame. Repair of the damaged components often requires complete removal from the drive assembly support structure, and hence, the wheelchair support frame which involves a complex task reserved for the skilled technician. Moreover, removal of the complete drive assembly may require a piecemeal removal of each drive component. That is, the drive assembly cannot be readily removed from the wheelchair support frame as an independent unit. Thus, the whole wheelchair apparatus must be brought in for repair. During this repair time, the wheelchair user may be without recourse.

Typical of such prior art powered wheelchair assemblies are the wheelchairs disclosed in U.S. Pat. No. 5,022,476 to Weege; U.S. Pat. No. 4,961,473 to Jones; U.S. Pat. No. 4,805,712 to Singleton; and U.S. Pat. No. 4,341,278 to Meyer, each of which describes an electric powered wheelchair having a drive assembly support structure forming an integral part of the wheelchair support frame.

Attempts have been made to modularize the drive assembly to aid removal of the components. U.S. Pat. No. 4,967,864 to Boyer et al. discloses a powered wheelchair apparatus having modularized individual components formed for easier removal from the drive assembly. While the Boyer wheelchair may facilitate removal of the individual components, the drive assembly, as a unit, is not removable.

Still other attempts have been made to retrofit independent electric drive units to manually operable wheelchairs. U.S. Pat. No. 4,767,864 and U.S. Pat. No. 4,386,672 to Coker disclose detachable electric drive units mountable proximate a front portion of the wheelchair. This device however, poses several problems. The forward mounting of the drive unit severely hampers the user's entry and exit of the wheelchair when the drive unit is installed, as well as impedes the movement of the user once situated in the operating position. This problem can be magnified for those users severely impaired. Additionally, the pivotal motion of the steering precludes the effective use of footrests for the occupant.

Moreover, powered wheelchairs are often bulkier and substantially heavier than their manually operated counterparts. The weight of the motor, in addition to the battery, can be significant. A battery alone may weigh in excess of 20 lbs. Moreover, two batteries are necessary in most instances. The wheelchair support frame must also be designed to accommodate this additional weight which itself adds weight. Thus, wheelchair users often prefer manually operable wheelchairs for home use. The additional bulkiness of powered wheelchairs impairs maneuverability inside close quarters. Further, the power driven wheels together with the additional weight can wear or damage the floors and rugs of a home. Accordingly, it is highly advantageous for the user of a powered wheelchair to also own a manually operated wheelchair for home use. Unfortunately, this requires the wheelchair user to have two wheelchairs at his or her disposal, which is costly and requires storage space.

Additionally, if the wheelchair user has only a powered chair, when drive assembly malfunctions occur, the wheelchair must be pushed about manually. This task is cumbersome and requires assistance because of the additional weight of the powered chair and the lack of user operable drive wheels. Thus, dual usage of a powered wheelchair as both a powered and a manually operated chair has not been practical.

Another problem associated with powered wheelchairs is that they are not as portable as manual wheelchairs. Manually operated wheelchairs are much easier to transport in automobiles because they often do not require any special vehicle modifications or accommodations. The collapsibility of many manually operated wheelchairs makes them particularly suitable for portability in vehicles. In contrast, most powered wheelchairs, because of the integral mounting of the drive assembly onto the support frame, occupy substantially more space and are usually not a collapsible as their manually operated counterparts. Moreover, the additional weight a powered wheelchair carries substantially impedes the lifting of the wheelchair into vehicles. Often special vans or automobiles having modified exteriors and interiors are necessary to lift and transport powered wheelchairs.

Still other problems associated with powered wheelchairs are that they have a tendency to tip backwards upon initial acceleration. The torque generated by the motor is often substantial and the unwary user may tip over. In light of this problem, anti-tip caster wheels are often provided rearward of the drive wheels. These caster wheels often are mounted on arms rigidly coupled to the support frame and are angled downward to a level just above the ground. As the wheelchair begins to tip backward, the anti-tip caster wheels engage the ground to prevent further tipping. Typical of this type of structure is the wheelchair of U.S. Pat. No. 4,721,321 to Haury et al.

While these anti-tip mechanisms have successfully prevented rearward tipping of the wheelchair apparatus in most instances, the rigid coupling of the anti-tip wheel to the support frame provides a fairly abrupt jolt to the wheelchair occupant as the anti-tip wheel engages the ground. In one instance, the occupant's momentum is pivoting rearward about the drive wheel axis; in another instance the occupant's momentum is shifted forward as the anti-tip wheel engages the ground. This momentum shift may jolt the occupant which can be physically tolling, particularly on those severely impaired.

Accordingly, it is an object of the present invention to provide a wheelchair apparatus which is operable as both a powered and a manually movable wheelchair.

Another object of the present invention is to provide a wheelchair apparatus with a removably mounted drive assembly.

It is another object of the present invention to provide a powered wheelchair apparatus which is more portable.

Still another object of the present invention is to provide a powered wheelchair apparatus which lowers the composite center of gravity.

Yet another object of the present invention is to provide a progressively rated anti-tipping suspension to a wheelchair apparatus.

It is a further object of the present invention to provide a wheelchair apparatus which is durable, compact, easy to maintain, has a minimum number of components, is easy to use by unskilled personnel, and is economical to manufacture.

The apparatus and method of the present invention has other objects and features of advantage which will be more readily apparent from the following description of the best mode of carrying out and invention and the appended claims, when taken in conjunction with the accompanying drawing.

DISCLOSURE OF INVENTION

The present invention includes a wheelchair comprising a wheelchair frame having a fore and an aft portion, and a seat assembly carried by the wheelchair frame. The wheel chair further includes power drive assembly with a drive assembly frame and a motor mounted to the drive assembly frame. Power drive wheels also are mounted to the drive assembly frame and are operably coupled to the motor. A drive assembly mounting mechanism releasably couples the drive assembly frame to the wheelchair frame proximate the aft portion of the wheelchair frame for driving of the wheelchair as a powered wheelchair and for selective removal of the power drive assembly as a unit from the wheelchair frame. Wheel mounted assemblies are also provided on the wheelchair frame to releasably receive a pair of manually-operable drive wheels. These drive wheels permit manual operation of the wheelchair apparatus when the power drive assembly is removed from the wheelchair frame.

In another aspect of the present invention an anti-tip suspension for the wheelchair is provided comprising a suspension arm assembly having a mounting mechanism for pivotally mounting the arm assembly to the wheelchair frame. The arm assembly includes a first arm portion which extends away from the mounting mechanism. A ground engaging device is provided on the first arm portion at a spaced distance from the mounting mechanism. Furthermore, the suspension arm assembly includes a pivotal motion resisting mechanism which resists pivoting of the first arm portion about the mounting mechanism when the wheelchair is tipped by an amount sufficient to cause the ground engaging device to contact the ground.

In yet another aspect of the present invention, a wheel lock assembly for a wheelchair is provided mounted to the wheelchair frame and formed to engage at least one of the manually-operable drive wheels to effect locking of the wheels thereof. The wheel lock assembly is mounted for movement between a deployed operable position and a stored inoperable position. In the deployed operable position, the wheel lock assembly extends laterally outwardly of the wheelchair frame by an amount enabling frictional engagement by the wheel lock assembly with one of the manually-operable drive wheels to effect braking thereof. In the stored position, the parking brake assembly is located laterally inwardly of the wheelchair frame.

These and other features and advantages of the present invention will become more apparent from the following description of exemplary embodiment thereof, as illustrated in the accompanying drawing.

BRIEF DESCRIPTION 0[THE DRAWING

BEST MODE OF CARRYING OUT THE INVENTION

The wheelchair apparatus of the present invention includes a detachable drive assembly removably mounted to a wheelchair frame. The drive assembly is detachable as an independent unit from the wheelchair frame so that the wheelchair apparatus may be manually operable. The following description is presented to enable a person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded with the widest scope consistent with the principles and features disclosed herein.

Figure 1:
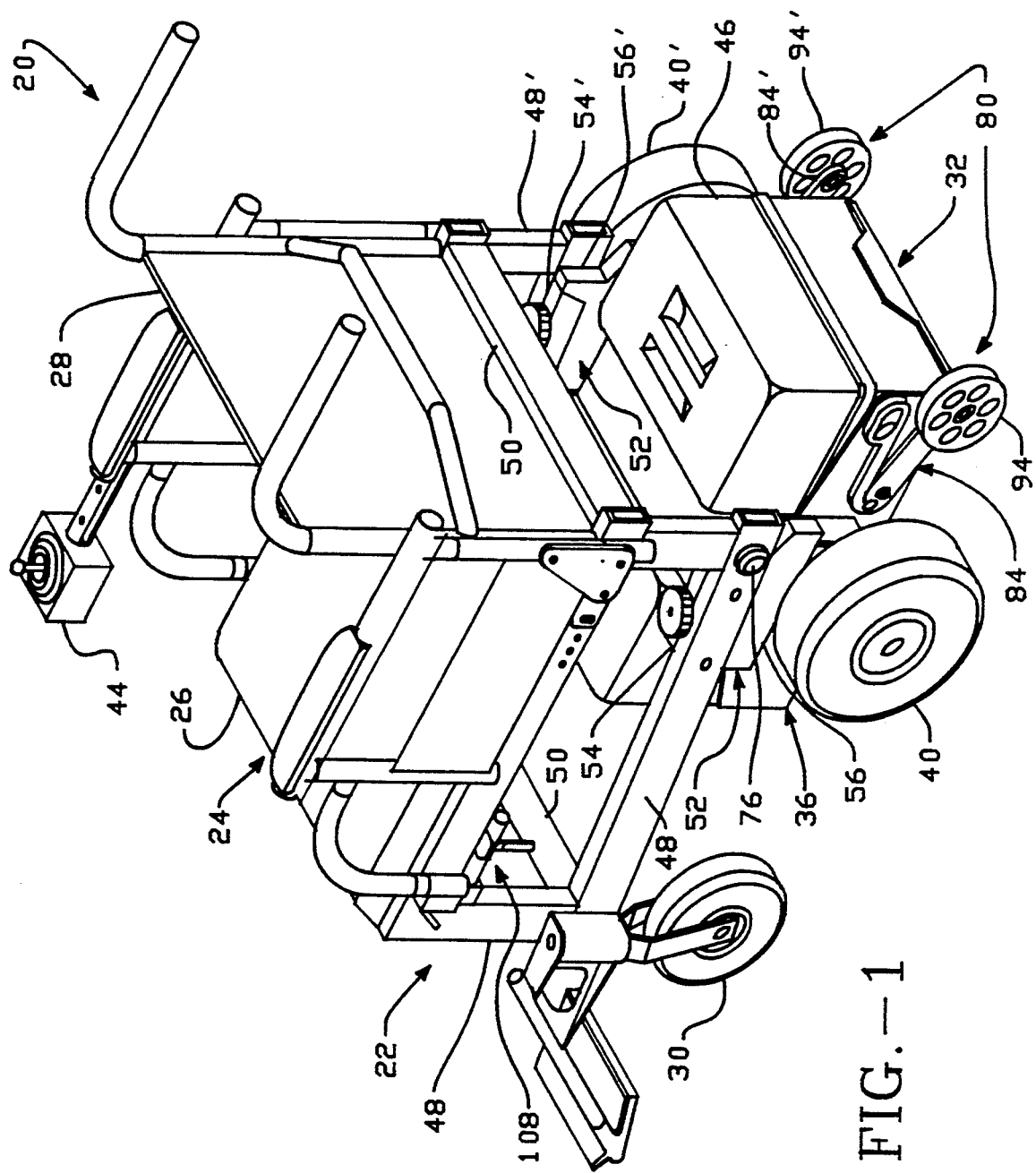
FIG. 1 is a top perspective view of a wheelchair apparatus constructed in accordance with the present invention and including a detachable power assembly.

It will be noted here that for a better understanding, like components are designated by like reference numerals throughout the various figures. Attention is now directed to FIG. 1, where the subject wheelchair apparatus, generally designated 20, is illustrated. Assembly 20, briefly, comprises a wheelchair frame means, generally designated 22, which carries a seat assembly 24 having a seat member 26 and a backrest member 28. A pair of front caster wheels 30 are pivotally mounted proximate a fore portion of wheelchair frame means 22 which provide support and aid steering. Detachably mounted proximate an aft portion of frame means 22 is an independent power drive assembly unit, generally designated 32, which provides powered mobility to wheelchair apparatus 20.

Figure 2:
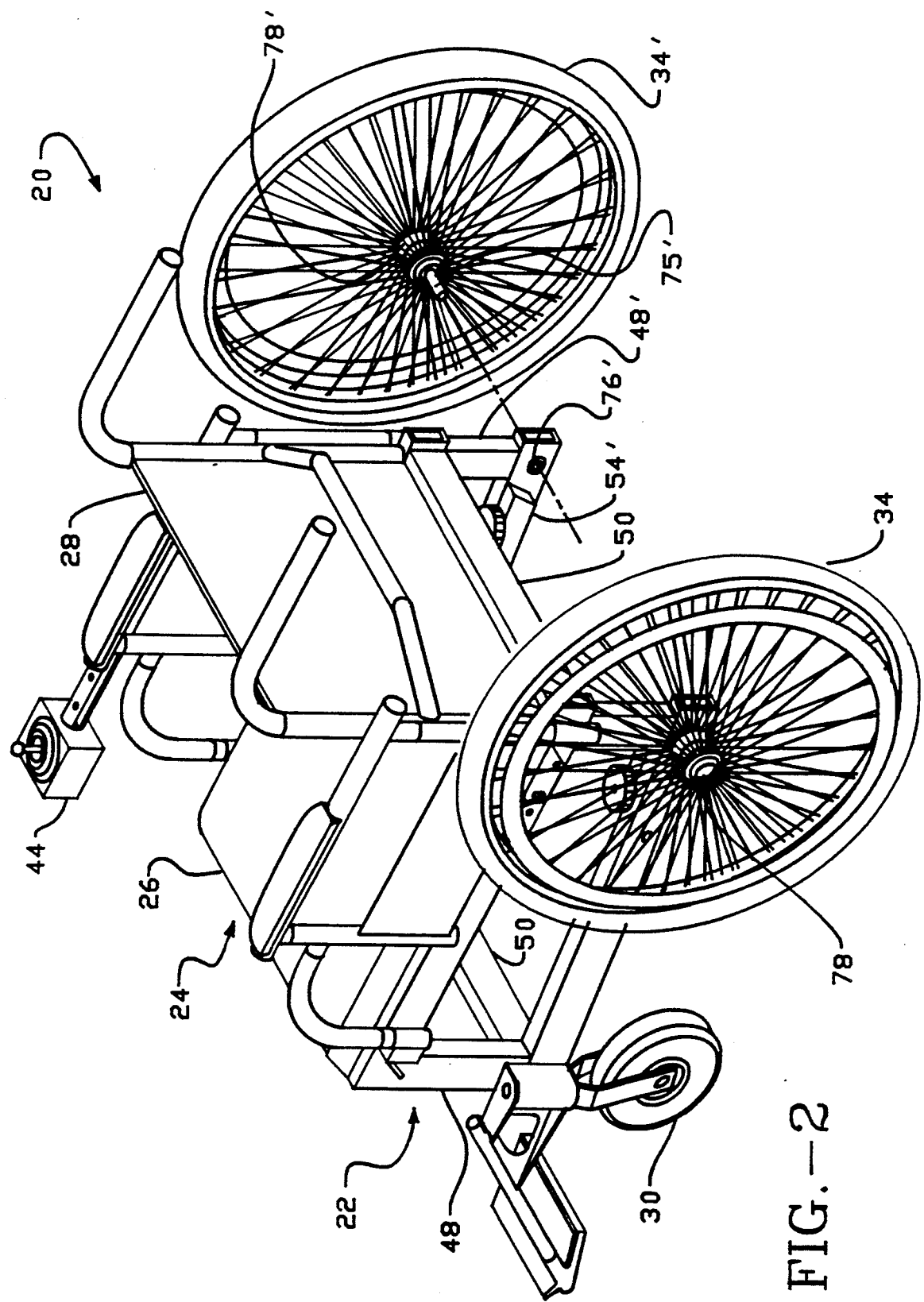
FIG. 2 is a schematic, top perspective view of the wheelchair apparatus of FIG. 1 with the power assembly removed and manually-operable wheels mounted thereto.

As will be described in greater detail below, drive assembly 32 is removably mounted proximate the aft portion of wheelchair frame means 22 and operates as a rear wheel drive mechanism for wheelchair apparatus 20. Drive assembly 32 is fully independent of frame means 22 and is formed for selective removal as a unit. When drive assembly 32 is detached from wheelchair frame means 22, manually-operable wheels, generally designated 34 and 34', may be removably mounted directly to frame means 22, as illustrated in FIG. 2. Therefore, wheelchair apparatus 20 is fully operable as either a powered wheelchair (FIG. 1), or a manually-operable wheelchair (FIG. 2) wherein wheelchair frame means 22 is free of any power drive assembly components.

The detachable power assembly configuration of the present invention is highly beneficial for numerous reasons. For example, this construction affords enhanced portability of the wheelchair apparatus, facilitates repair of the drive assembly, and eliminates the need to have more than one wheelchair. Transportation of wheelchair apparatus 20 is facilitated by the removal of power drive assembly 32 as an independent unit. The current commercially available powered wheelchairs, where the drive assemblies are not removable as a unit, are often too heavy to lift as a whole or would require substantial disassembly to remove the integrally mounted drive unit. In contrast, removal of power drive assembly 32 in accordance with the present invention, a fairly simple procedure. Once removed, the weight of wheelchair apparatus 20 is substantially reduced so that it may be more easily lifted or moved. Similarly, drive assembly 32, once removed from the main wheelchair frame, is lighter and less bulky. This detachable construction, therefore, greatly eases wheelchair portability.

Furthermore, should power drive assembly 32 malfunction, it can easily be detached from wheelchair frame means 22 and independently brought to a shop for repair as a unit, rather than requiring the whole wheelchair apparatus 20 to be brought into the shop. Moreover, power drive assemblies 32 can be interchangeable so that should the individual's power drive assembly 32 need repair, a replacement drive assembly 32 may be used in the repair interim. This substantially eliminates "down time" of the powered wheelchair apparatus 20 during repair time.

Because wheelchair apparatus 20 is fully operable as a manual wheelchair (FIG. 2), it may not be a necessary to own both a manual chair in addition a powered chair. For example, for home use or in close confines, power drive assembly 32 may simply be detached from wheelchair frame means 22 and replaced with manually operable wheels 34 and 34'. Accordingly, manually-operable wheelchair apparatus 20 will not unduly wear or harm the rung and floors the way a powered wheelchair may.

Figure 3:
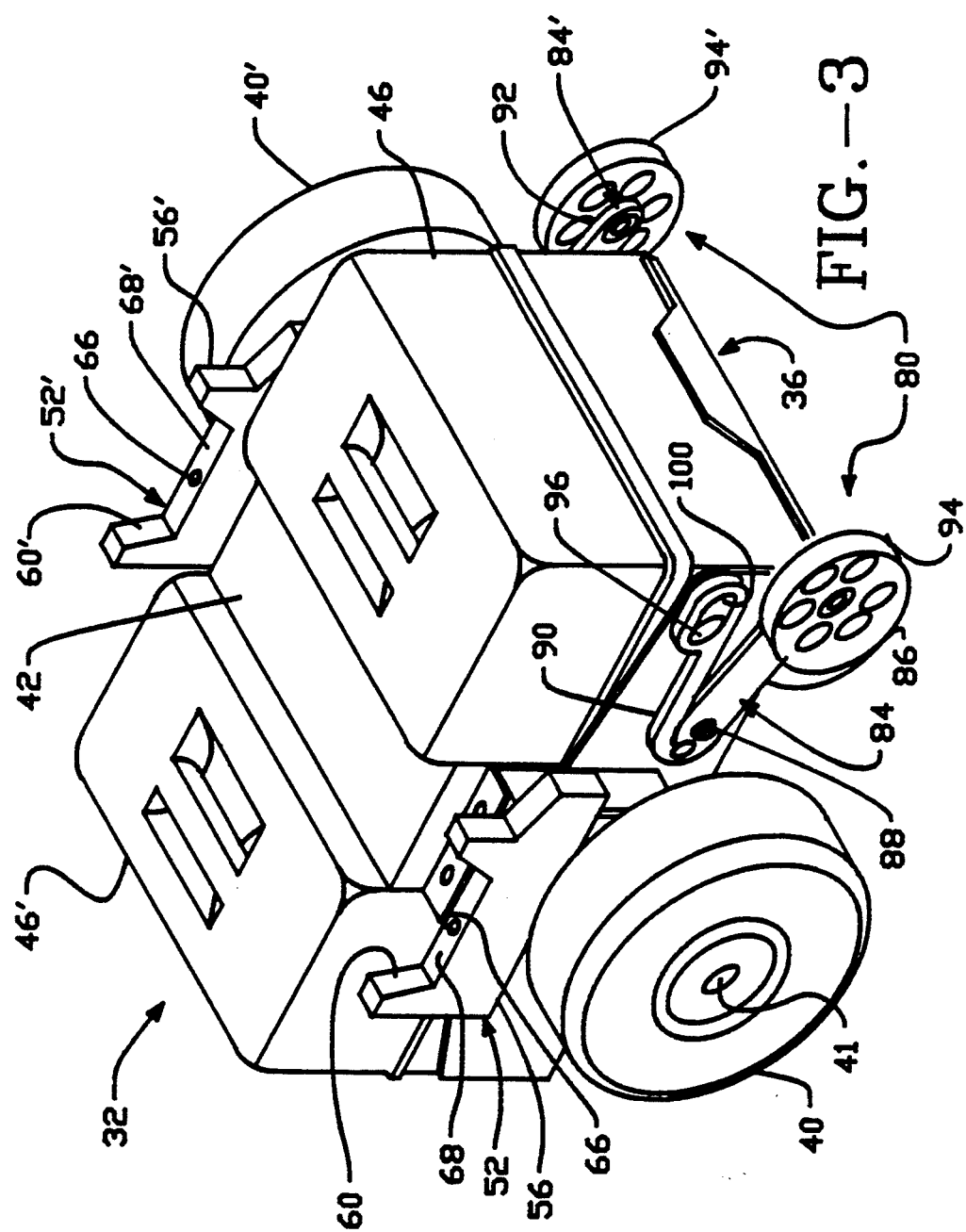
FIG. 3 is an enlarged, top perspective view of the detachable drive assembly constructed in accordance with the present invention.
Figure 4:
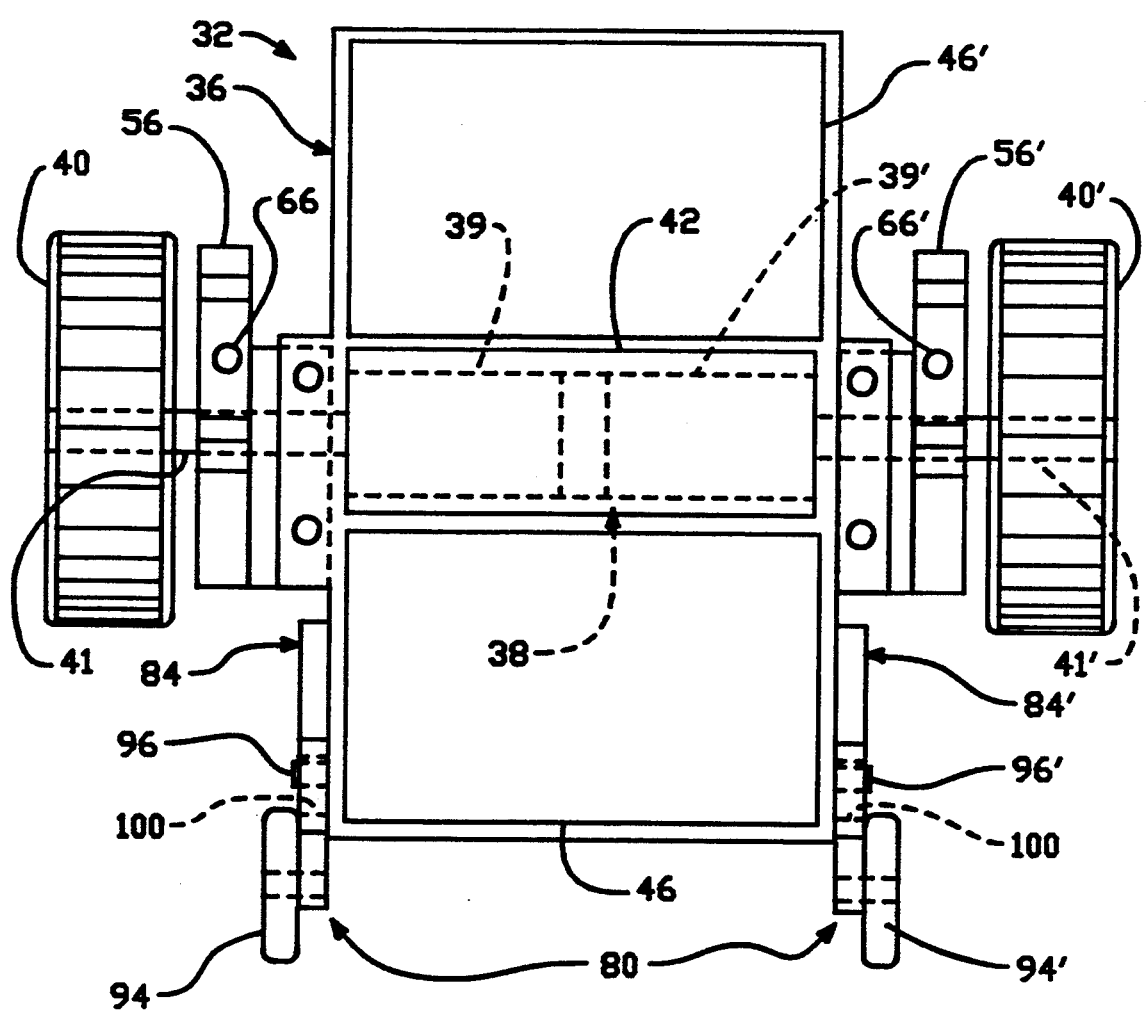
FIG. 4 is a top plan view of the detachable drive assembly of FIG. 3.
Figure 5:
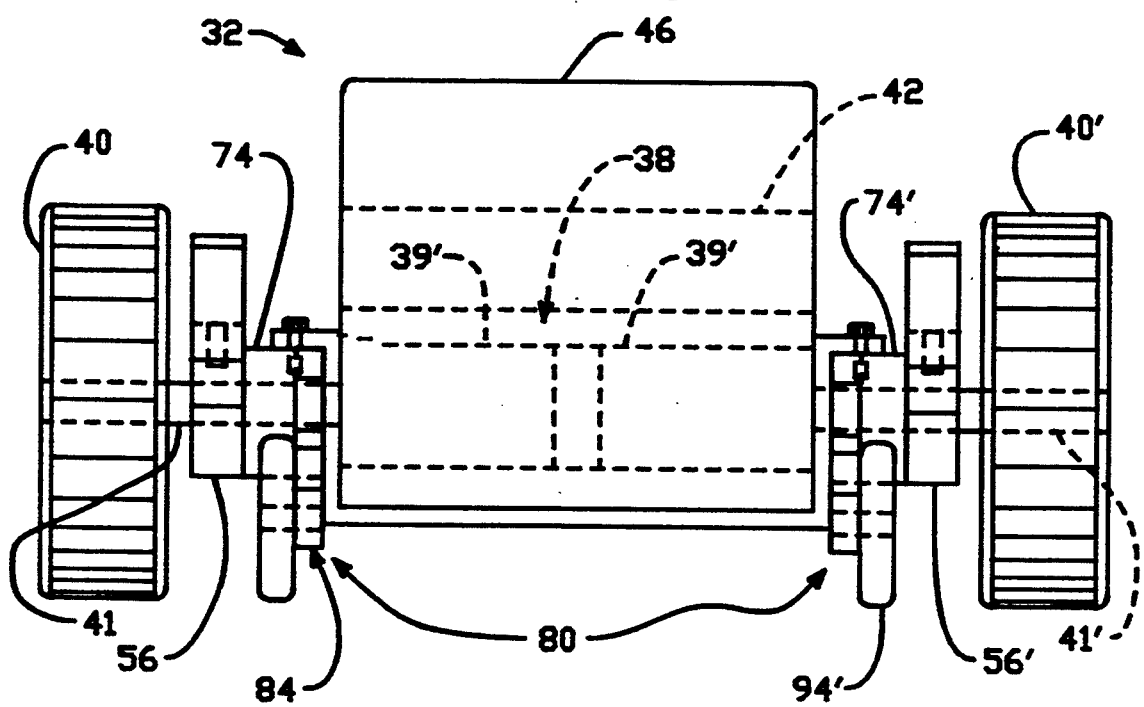
FIG. 5 is a rear elevation view of the detachable power assembly of FIG. 3 and illustrating the mounting spacers.

Power drive assembly 32 can be seen in FIG. 3-5, include a drive frame means 36 suitably formed to support motor means, generally designated 38. Motor means 38 is drivably coupled to a pair of powered wheels 40 and 40' which are standard wheels employed by various powered wheelchairs. In the preferred embodiment, motor means 38 is provided by two motors 39 and 39' (FIGS. 4 and 5) are employed, each of which drives one powered wheel 40 and 40', and each of which are centrally mounted to drive frame means 36. This configuration is especially beneficial in facilitating short radius turns. Each motor 39 and 39' may drive the corresponding powered wheel 40 and 40' in opposite rotational directions which will turn wheelchair apparatus 20 about a much smaller radius.

Motors 39 and 39' are preferably common electric motors generally known in the field. It will be appreciated, however, that a combustion motor or other equivalent device employed to power wheels 40 and 40' could be used without departing from the true spirit and nature of the present invention.

Power drive assembly 32 further includes an electronic controller unit 42 which is operably coupled to a joystick device 44 (FIGS. 1 and 2) mounted proximate seat assembly 24. Accordingly, the user may easily control the operation and direction of wheelchair apparatus 20 from a seated position.

Because two independent motors 39 and 39' are employed by power drive assembly 32, it is also preferable to include two independent batteries 46 and 46' (i.e., one for each motor). As shown in FIGS. 3 and 4, batteries 46 and 46' (preferably encased in battery covers) are mounted to drive frame means 36 on opposite sides of centrally mounted motors 39 and 39'. This mounting symmetry balances most of the weight of drive assembly 32 about a horizontal axis extending through the drive axles 41 and 41'. As will be discussed in more detail below, drive assembly 32 includes adjustments which permit the positioning of drive assembly 32 relative to the wheelchair frame in a manner allowing the overall center of gravity of the chair to be adjusted. This symmetry of the drive assembly weight also reduces the moment of inertia about a vertical axis, which permits wheelchair apparatus 20 to turn easily at a small turn radii and enables a more controlled turn acceleration, as compared to current commercially available wheelchair assemblies. This considerably facilitates user maneuverability, particularly in small confines.

Furthermore, FIG. 1 illustrates that power drive assembly 32 is compact and is situated fairly low to the ground relative to wheelchair frame means 22. Because the weight of drive assembly 32 represents a substantial percentage of the overall weight of wheelchair apparatus 20, the cumulative wheelchair apparatus center of gravity (CG) will also be lowered. This configuration (i.e., lowered CG) minimizes lateral tipping of wheelchair apparatus 20 during the above-mentioned small radius turns or the like.

Wheelchair frame means 22 includes two substantially parallel, trapezoidal side frame members 48 and 48' (FIGS. 1 and 2) rigidly coupled together by a crossbar members 50. Trapezoidal side frame members 48 and 48' and cross-members 50 are preferably hollow rectangular tube structures of sufficient rigidity and thickness to support and carry seat assembly 24 and its passenger. Trapezoidal side frame members 48 and 48' are preferably formed to be positioned adjacent to and on opposite sides of power drive assembly 32 so as to straddle it, as shown in FIG. 1. This eases mounting and positioning of power drive assembly 32 relative to wheelchair frame means 22.

Power drive assembly 32 is detachably mounted to wheelchair frame means 22 through a mounting assembly, generally designated 52. As best viewed in FIGS. 1 and 6, mounting assembly 52 includes a first mounting element 54 secured by fasteners 55 to an inner side of side frame member 48 and a second mounting element 56 carried by drive frame means 36. Mounting assembly 52' similarly includes a first mounting element 54' and a second mounting element 56'. Both first mounting elements 54 and 54', and corresponding second mounting elements 56 and 56' are convergently tapered in a downward direction and formed for mating nested engagement with one another. Thus, each first mounting element 54 and 54' includes downwardly facing wedge-shaped surface 58 which promotes mounting stability with mating surface 60 of second mounting element 56 and 56'. It will be appreciated that both first mounting element 54 and 54' and second mounting element 56 and 56' could be convergently tapered in a upward direction, with the female receiving element mounted to frame members 48 and 48' and the male elements mounted to frame means 36. Moreover, first mounting element 54 and 54' and second mounting element 56 and 56' could include rounded male-female mating members or pin-and-socket mating members without departing from the true spirit and nature of the present invention.

Figure 6:
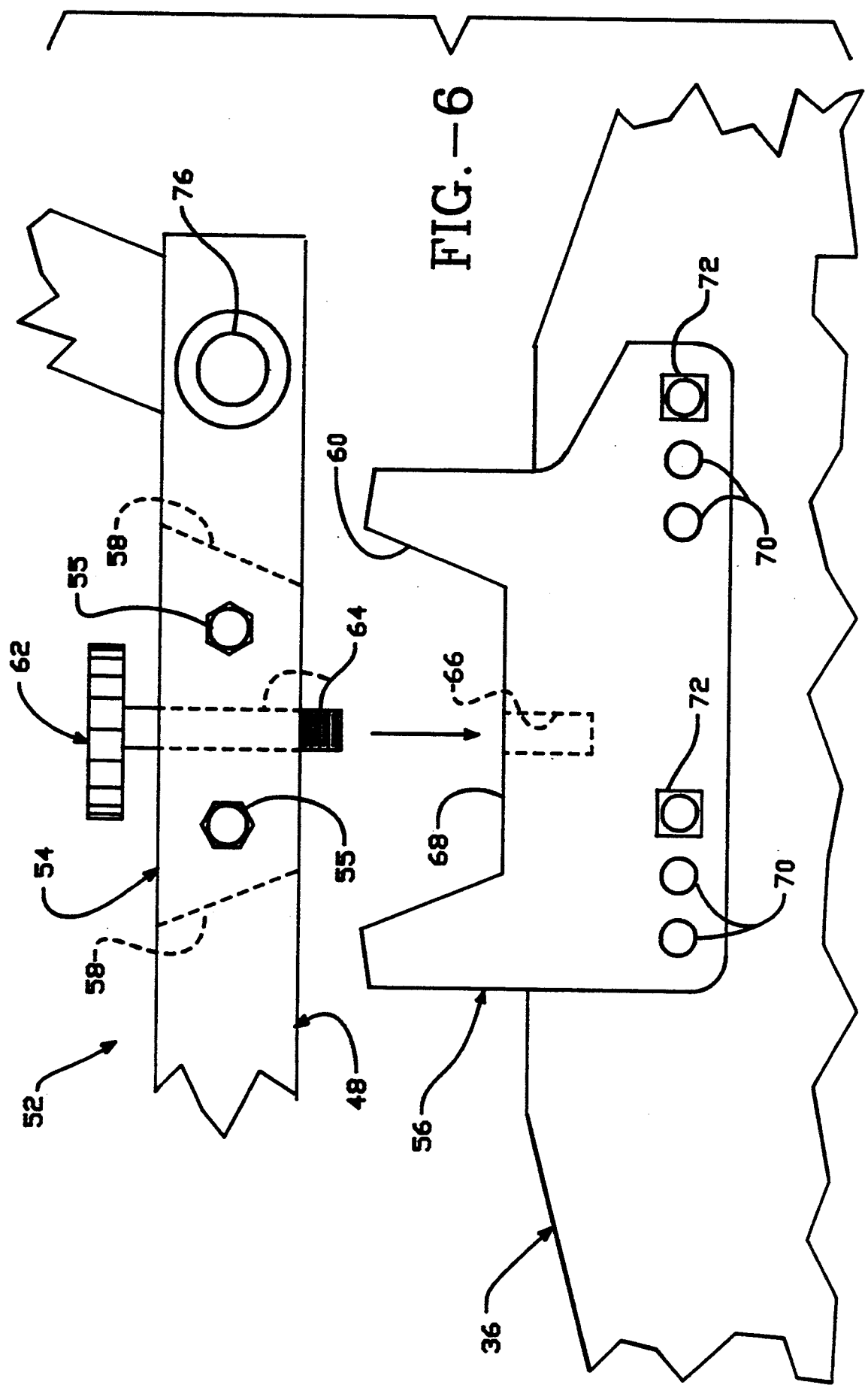
FIG. 6 is a fragmentary, enlarged, schematic side elevation view of the detachable drive assembly mounting mechanism.

A threaded fastener 62, as shown in FIG. 6, permits releasable mounting of first mounting element 54 to corresponding second mounting element 56. Fastener 62 preferably includes a bolt portion 64 extending through first mounting element 54. Bolt portion 64 is received in a corresponding threaded opening 66 provided in an upward facing surface 68 of second mounting element 56. Virtually any quick release fastener may be employed, however. When bolt portion 64 is threadably fastened in opening 66, the downwardly facing wedge-shaped surface 58 of first mounting element 54 matingly engages the upwardly facing mating surface 60 of second mounting element 56. Accordingly, mounting assembly 52 provides an accurate, rigid, yet quick release mounting method of power drive assembly 32 to wheelchair frame means 22.

FIG. 6 further illustrates that each second mounting element 56 and 56' may be situated at a plurality of positions along the sides of drive frame means 36. A plurality of alignment bores 70 extend through a side portion of each second mounting element 56 and 56'. Alignment of selective alignment bores 70 with corresponding mounting holes (not shown) extending through drive frame means 36 permit second mounting element 56 and 56' to moved between a fore and an aft portion relative to drive frame means 36. Alignment fasteners 72 are used to releasably mount second mounting elements 56 and 56' to drive frame means 36. Adjusting second mounting elements 56 and 56' between the fore and the aft portion of drive frame means 36 allows favorable positioning of power drive assembly 32 relative to the vertical axis extending through the combined wheelchair center of gravity. In turn, the moment of inertia about such vertical axis can be minimized to facilitate turning acceleration, as mentioned above.

Turning now to FIGS. 4 and 5, spacers 74 and 74' may be provided, of varying thickness, between drive frame means 36 and second mounting elements 56 and 56'. Spacers 74 and 74' position second mounting elements laterally outward from drive frame means 36. This permits precise alignment of second mounting element 56 and 56' with the corresponding first mounting element 54 and 54' for wheelchair frame means 22 having different width dimensions, i.e., cross-members 50 of differing length. Thus, the detachable power drive assembly of the present invention can be mounted to wheelchairs of customized width simply by changing spacers 74 and 74'.

In accordance with the present invention, power drive assembly 32 may be detached from wheelchair frame means 22, as a unit, and wheelchair apparatus 20 may be operated as a manually powered wheelchair. As best shown in FIG. 2, a pair of preferably 24 41 diameter manually-operable wheels 34 and 34' are releasably mounted to wheelchair frame means 22. Manual wheel mounting passageways 76 and 76' are provided proximate the aft portions of each trapezoidal side frame member 48 and 48'. Mounting passageways 76 and 76' are dimensioned to releasably receive the axle portions 75' of manually-operable wheels 34 and 34'. In the preferred form, wheels 34 and 34' include quick release hubs 78 and 78' commonly known in the field which provide quick release of wheels 34 and 34' from mounting passageways 76 and 76'.

Mounting passageways 76 and 76' are positioned vertically on trapezoidal frame members 48 and 48' at a level which preferably positions seat assembly 24 at a height substantially similar to the seating height when drive assembly 32 is mounted to wheelchair frame means 22. It is noted that the vertical positioning of mounting passageways 76 and 76' could be adjustable so as to accommodate different diameter manually operable wheels, if desired. Similarly, the fore and aft positioning of mounting passageways 76 and 76' along trapezoidal frame members 48 and 48' is selected to position the manually-operable wheels 34 and 34' at substantially the same location as powered-wheels 40 and 40' of drive assembly 32. This assures that the mobility characteristics between the powered wheelchair apparatus and the manually operable wheelchair apparatus are not radically different. It also will be understood that a plurality of fore and aft locations for passageways 76 and 76' could be provided.

In another aspect of the present invention, it is recognized that angular acceleration of power driven wheels 40 and 40' can cause wheelchair apparatus 20 to tip rearward. Thus, an anti-tip suspension, generally designated 80, is provided which non-linearly resists rearward tipping of wheelchair apparatus 20 during abrupt accelerations. As best viewed in FIGS. 3 and 7, anti-tip suspension, generally designated 80, includes a pair of suspension arm assemblies 84 and 84' pivotally mounted to opposite sides of drive frame means 36. Although preferably two independent suspension arm assemblies 84 and 84' are provided, it will be understood that a single suspension arm assembly 84 may adequately provide the desired variable rate resistance necessary to provide a suspension function and an anti-tipping function. Moreover, it is noted that anti-tip suspension 80 can be pivotally mounted to wheelchair frame means 22 rather than drive frame means 36 without departing from the true spirit and nature of the present invention. For brevity, only one suspension arm assembly 84 will be described in detail.

Suspension arm assembly 84 is formed to provide a variable rate resistance to displacement which progressively increases as suspension 80 increasingly engages the ground 82. When suspension arm assembly 84 is vertically compressed, as shown in phantom lines in FIG. 7, the resistance rate of suspension 80 increases non-linearly further resisting rearward tipping. This configuration has been found to provide a smooth transitional force opposing tipping. The nonlinear resistance eliminates the abrupt stops or severe jolts commonplace in the prior art anti-tipping devices provided. Furthermore, the force returning wheelchair 20 to its normal stable position, with front caster wheels 30 on ground 82, also decreases nonlinearly so as not to throw or launch the occupant forward as front caster wheels 30 once again engage ground 82. Accordingly, the present invention effectively resists rearward tipping and gently returns wheelchair 20 to its normal operating position. By comparison, the relatively rigid cantilever-type antitip designs of the prior art are not specifically designed for progressive resistance and generally are formed merely as anti-tipping stops. Engagement, upon rearward tipping, with these devices is often abrupt and jolting to the user.

Figure 7:
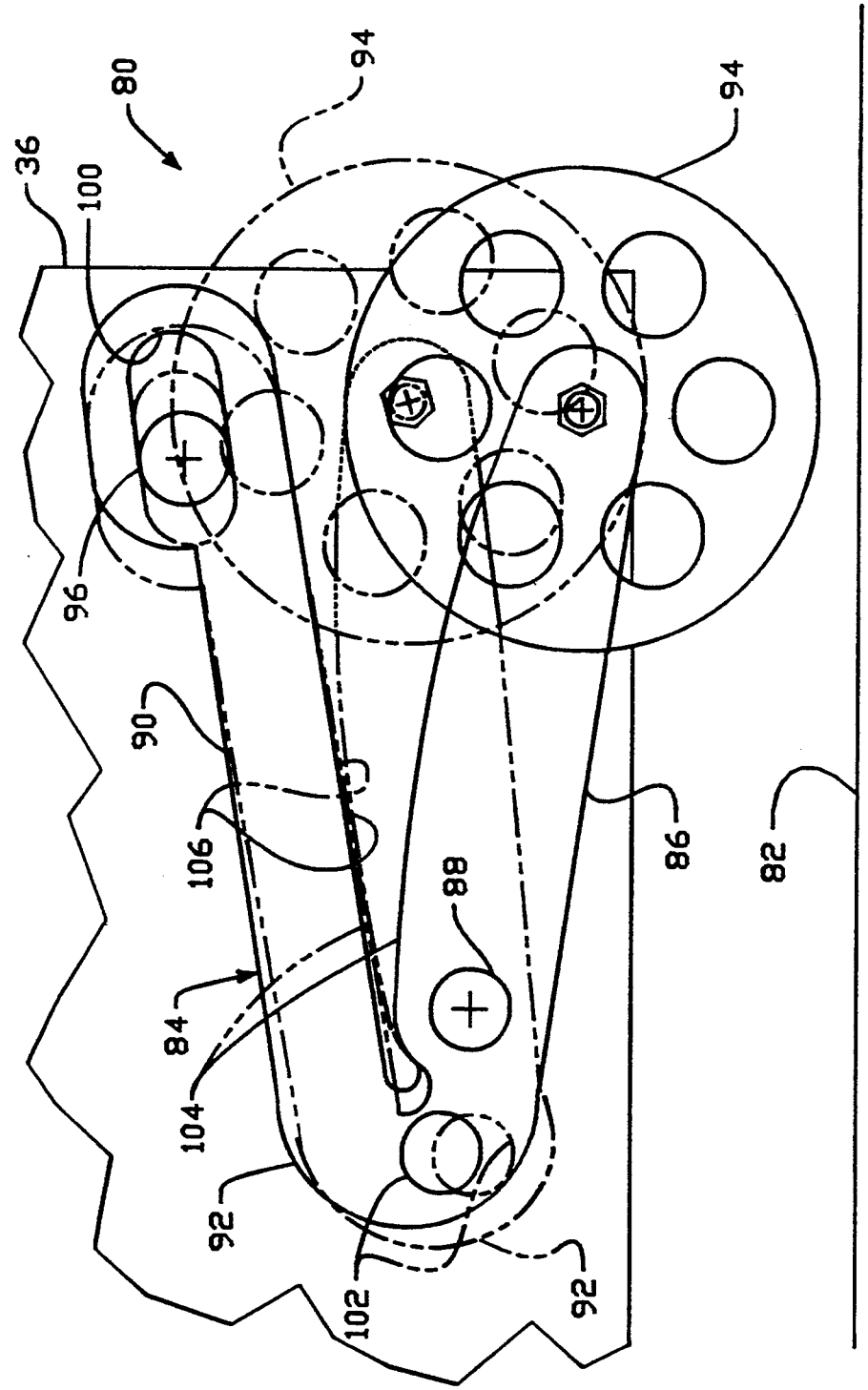
FIG. 7 is an enlarged, side elevation view of the anti-tip suspension designed in accordance with the present invention.

Moreover, and very importantly, the variable resistance feature allows arm 84 to support wheel 94 very close to support surface 82, as best seen in FIG. 7. This positioning, less than one inch above support surface 82 could not be tolerated if arm 84 were rigidly mounted to the wheelchair. The resilient, nonlinear support of arm 84, however, allows it to have a ground engaging means, such as a wheel 94, positioned close to the ground so as to almost immediately start to resist tipping with an initially low force that increases with increased displacement. This smooths the resistance to tipping so as to reduce jolting and jarring of the rider. Moreover, small bumps and undulations in support surface 82 can be easily accommodated by displacement of wheel 94 and arm 82 upwardly against a resistance force that is relatively low during initial arm displacement and increases smoothly if large displacements occur.

As best shown in FIGS. 1 and 3, suspension arm assemblies 84 and 84' are preferably positioned proximate the aft portion of drive frame means 36. Suspension arm assembly 84 includes a first or pivotal arm portion 86 extending downward and away from, and mounted for pivotal movement about, a first stationary mount or pivot pin 88. A second or sliding arm portion 90 extends away from first stationary mount 88 in the aft direction, and includes a flexible apex or knee portion 92 extending from the upper end of pivotal am portion 86 proximate first stationary mount 88. Accordingly, sliding arm portion 90 and pivotal arm portion 86 diverge from knee portion 92 forming a V-shaped suspension arm assembly 84 with each arm portion defining one side of the V. A ground engaging wheel 94 preferably is rotatably mounted to the lower end of pivotal arm portion 86.

Suspension 80 is movably mounted about two stationary mounts which are secured to drive frame means 36. The first stationary mount 88, already described above, provides pivotal displacement of pivotal arm portion 86 about first stationary mount 88. A second stationary mount 96 is positioned proximate an upper end of sliding arm portion 90 opposite knee portion 92. Second stationary mount 96 is formed and dimensioned to slidingly engage a slot 100 provided in the upper end of sliding arm portion 90. Slot 100 extends longitudinally along sliding portion 86 and is formed to prevent rotation of sliding arm portion 90 about first stationary mount 88. However, slot 100 permits sliding translational movement of sliding arm portion 90 relative to second stationary mount 96 for the reasons to be described henceforth.

In accordance with the present invention, suspension arm assembly 84 non-linearly and progressively increases resistance against rearward tipping as the end portion of pivotal arm portion 86 vertically displaces relative to sliding arm portion 90. As shown in phantom lines in FIG. 7, V-shaped suspension arm assembly 84 is resiliently flexible about knee portion 92. This resilient flexibility permits substantial vertical displacement of the lower end portion of pivotal arm portion 86 when ground engaging caster wheel 94 engages ground 82. Knee portion 92 includes a flexibility opening 102 extending substantially horizontally through knee portion 92. Opening 102 provides greater flexibility and more displacement of pivotal arm portion 86 about first stationary mount 88.

An upward facing cam surface 104 is provided on pivotal arm portion 86 which is positioned to engage an opposing contact surface 106 on sliding arm portion 90. As shown in the phantom lines of FIG. 7, during substantial upward displacement of pivotal arm portion 86 about first stationary point mount or pin 88 (e.g., when wheelchair apparatus 20 is tipped substantially rearward), cam surface 104 is drawn into rockable contact with opposing contact surface 106. The initial contact between cam surface 104 and opposing contact surface 106 occurs proximate pivot pin 88 so that the resistance to flexing of knee portion 92 is relatively low. However, as cam surface 104 increasingly engages opposing contact surface 106, the curvature of cam surface 106 causes the contact to occur at a greater radial distance from pivot pin 88 which, further, causes sliding arm portion 90 to slightly bow. This increases the resistance to upward pivoting in a non-linear manner. Furthermore, pivoting of suspension arm 84 about first stationary mount 88 also causes sliding translational movement of sliding arm portion 90, via slot 100, with respect to second stationary mount 96. Thus, the above-mentioned combination of conditions culminate to provide a non-linearly increasing resistance force against rearward tipping.

Because it is desirable for sliding arm portion 90 to slightly bow or flex as cam surface 104 increasingly engages contact surface 106, sliding arm portion 90 is preferably composed of a material slightly more resilient or flexible than pivotal arm portion 86. Therefore, although suspension arm assembly 84 is preferably a unitary structure, sliding arm portion 90, pivotal arm portion 86 and knee portion 92 may be composed a combination of different resilient semi-flexible materials. For example, composite plastics or the like are particularly suitable. In this manner, the non-linear resistance can be programmed for a particular use. Moreover, the cross-sectional configurations and dimensions of sliding arm portion 90, pivotal arm portion 86 and knee portion 92 may be varied to program the desired non-linear resistance properties.

Figure 8:
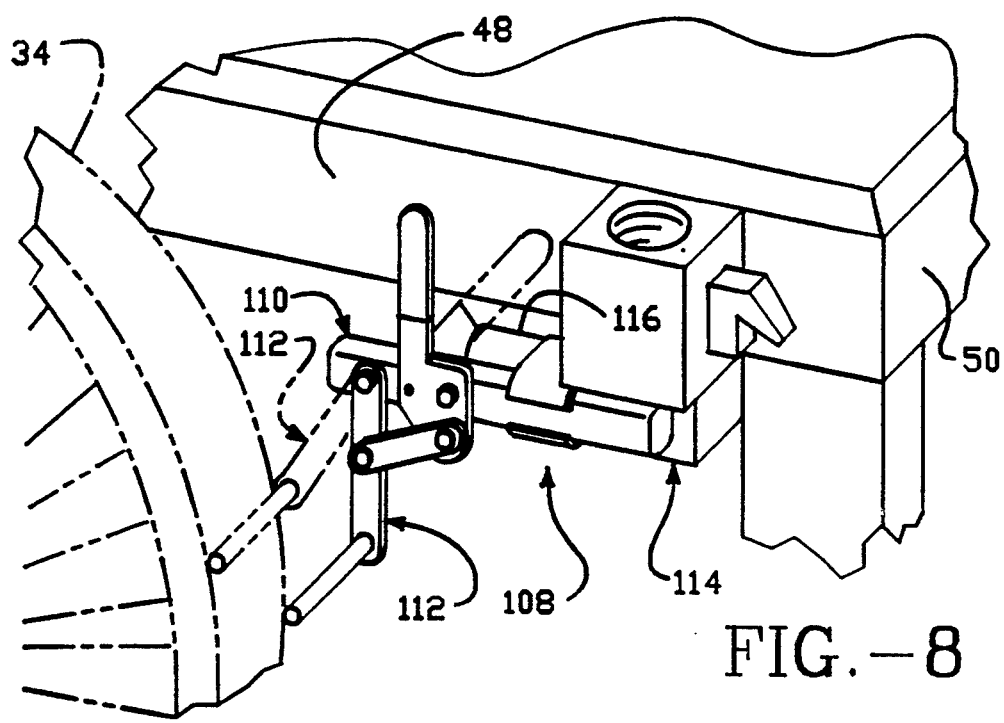
FIG. 8 is an enlarged, top perspective view of the manual wheel lock assembly constructed in accordance with the present invention and illustrating a "deployed" position.
Figure 9:
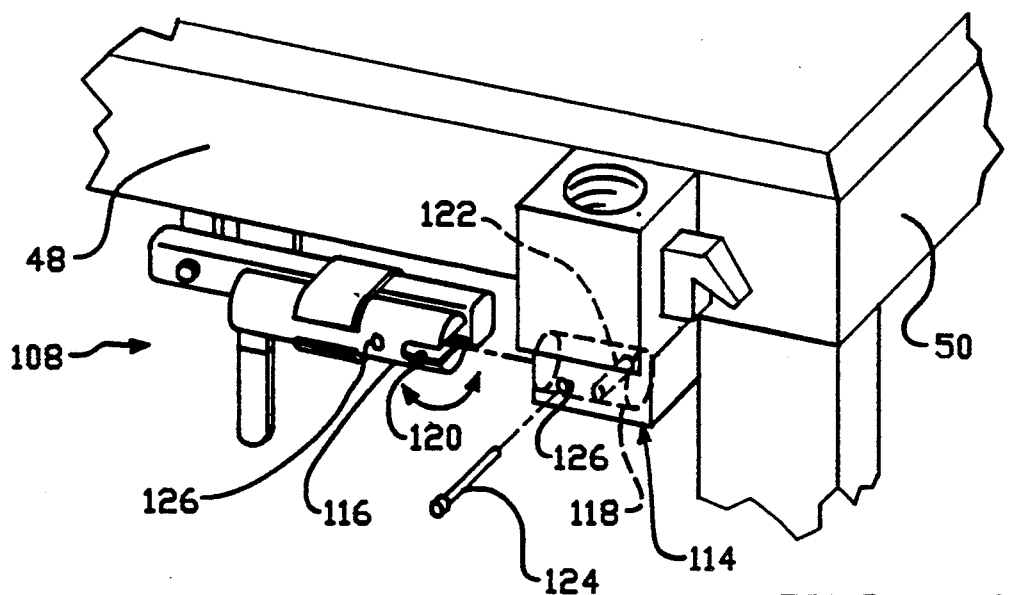
FIG. 9 is a top perspective view of the manual wheel lock assembly of FIG. 8 and illustrating a "stored" position.

In still another aspect of the present invention, a wheel lock assembly, generally designated 108, is provided to effect locking of manually-operable wheels 34 and 34' during manual operation of wheelchair apparatus 20 (i.e., when power drive assembly 32 is detached). In accordance with the present invention, wheel lock assembly 108 is mounted for movement between a "deployed" operable position (FIG. 8) and a "stored" inoperable position (FIG. 9). It will be understood that the "deployed" position represents the orientation of wheel lock assembly 108 in which it may be extended into frictional engagement with the corresponding manually-operable wheel 34 to effect locking thereof. In this orientation, wheel lock assembly 108 may be moved between one of two positions. The first "deployed" position corresponds to a non-locking position (shown in solid lines in FIG. 8) which is free of frictional engagement with manually-operable wheels 34 and 34'. The second "deployed" position (shown in phantom lines) corresponds to a locking position in which wheel lock assembly 108 is extended to effect locking of manually-operable wheels 34 and 34'. Thus, the "deployed" position is typical of the standard, fixed orientation of the wheel lock assemblies employed on most prior art wheelchair assemblies.

In contrast, the "stored" position (FIG. 9) of the present invention corresponds to an orientation which places wheel lock assembly 108 out of reach and stowed for non-use. This stowed position is particularly useful when power drive assembly 32 is attached to wheelchair frame means 22 and manually-operable wheels 34 and 34' are dismounted therefrom. Because wheel lock assembly 108 is inoperable to effect locking when wheelchair apparatus 20 is arranged to be power driven, manual wheel lock assembly 108 is a potential nuisance in some instances. Accordingly, it is preferable to reposition wheel lock assembly 108 out of operable use.

Wheel lock assembly 108 includes a first mounting member 110 carrying a wheel engaging means 112 mounted on one end thereof which is suitably formed for frictional engagement with manually-operable wheel 34. Wheel engaging means 112 is similar to most common manual wheel locks employed in the industry. A second mounting member 114 is rigidly fixed to wheelchair side frame means 48 proximate an upper cross-frame member 50. (Note that the wheelchair is reversed in position in FIGS. 8-10 from the position of FIGS. 1 and 2.) Mounting member 114 is formed and dimensioned for sliding rotatable engagement with first mounting member 110. This arrangement permits first mounting member 10 to be rotatably positioned in either the "deployed" position (FIG. 8) and the "stored" position (FIG. 9).

First mounting member 110 includes a post member 116 formed to extend laterally along wheelchair frame means 22. Second mounting member 114 is preferably a sleeve-like member providing a post receiving opening 118 which is formed and dimensioned to slidably receive an end of post member 116. Accordingly, post member 116 is telescopically mounted for pivotal movement relative to opening 118 between the "stored" inoperable position and the "deployed" operable position. It will be appreciated that the post member/receiving opening arrangement between first mounting member 110 and second mounting member 114, respectively, may be reversed without departing from the true spirit and nature of the present invention.

Figure 10:
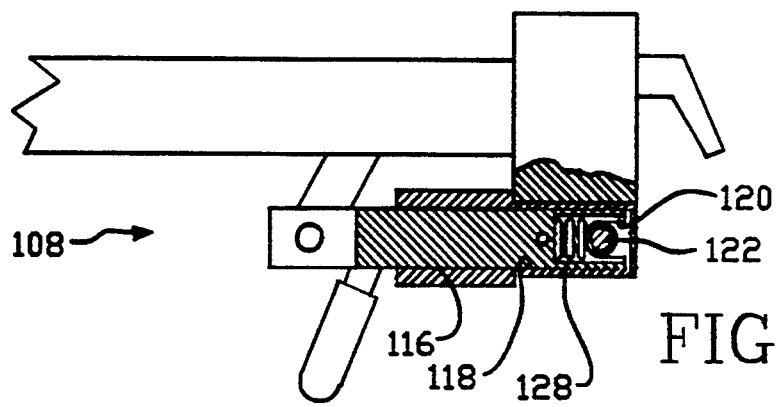
FIG. 10 is a side elevation view, partially broken away, of the manual wheel lock assembly of FIG. 8 and showing the spring assembly.

An alignment slot 120 is provided proximate the distal end of post member 116, as best shown in FIGS. 9 and 10. Alignment slot 120 is formed and dimensioned to slidably receive an alignment bar 122 positioned inside post receiving opening 118. The proper positioning and interengagment between alignment slot 120 and alignment bar 122 orient wheel lock assembly 108 in either the "deployed" position or the "stored" position. As post member 116 is telescopically received in opening 118, wheel lock assembly 108 is approximately positioned in either the "deployed" position or the "stored" position wherein alignment slot 120 will matingly engage and receive alignment bar 122 provided in bore 118 and extending transversely thereacross. It is noted that the "stored" position is preferably rotated approximately 180 Degrees from the "deployed" position. Upon interengagement therebetween, wheel lock assembly 108 will be more precisely aligned in one of the above-mentioned positions.

As shown in FIGS. 9 and 10, a quick-release locking pin 124 releasably locks post member 116 relative to receiving opening 118 in either the "deployed" position or the "stored" position. Hence, alignment bar 122 will not inadvertently disengage from alignment slot 120 so that first mounting member 110 is free to pivot about second mounting member 114. In the preferred form, complimentary locking bores 126 are provided in and extend through both post member 116 and sleeve-shaped second mounting member 114. Locking bores 126 are formed and dimensioned to receive locking pin 124, and are positioned to cooperate with the alignment slot/bar to releasably lock wheel lock device 108 in either the "stored" or the "deployed" position. After locking pin 124 has been inserted through locking bores 126, the positioning of post member 116 relative to receiving opening 118 will be releasably preserved.

In an alternative embodiment of wheel lock assembly 108, a retaining spring member 128 is coupled between telescopically mounted post member 116 and post receiving opening 118, as viewed in FIG. 10. Retaining spring member 128 resiliently retains post member 116 telescopically mounted relative to opening 118 to facilitate interengagement between alignment slot 120 and alignment bar 122 before locking pin 124 is inserted into locking bores 126. Retaining spring member 128 is preferably a coil-type tension spring having one end coupled to alignment bar 122 and the opposing end mounted inside post member 116. Spring member 128 is formed to permit pivotal movement of post member 116 relative to post receiving opening 118.

While the invention has been described in connection with what is presently considered to be the most practical and preferred embodiments, it is to be understood that the invention is not limited to the disclosed embodiment but, on the contrary, is intended to cover various modifications and equivalent arrangements included within the spirit and scope of the appended claims.

Therefore, persons of ordinary skill in this field are to understand that all such equivalent structures are to be included within the scope of the following claims.

What is claimed is:

1. A wheelchair comprising:
   a wheelchair frame having a fore portion and an aft portion;
   a seat assembly carried by said wheelchair frame;
   a power drive assembly including a drive assembly frame, a motor mounted to said drive assembly frame, at least one power drive wheel mounted to said drive assembly frame and operably coupled to said motor;
   said power drive assembly being removably coupled to said aft portion of said wheelchair frame by a mounting structure including a first mounted element carried by said wheelchair frame, a second mounting element carried by said drive assembly frame, and a fastener releasably coupling said first mounting element to said second mounting element, said second mounting element including a positioning structure for coupling said second mounting element to said drive assembly frame at a plurality of positions changing the location of a center of gravity of said wheelchair; and
   a wheel mounting structure provided on said aft portion of said wheelchair frame and formed to releasably receive a pair of manually operable drive wheels for mounting to said wheelchair frame when said power drive assembly is removed from said wheelchair frame.

2. The wheelchair as defined in claim 1 wherein, said positioning structure is formed for coupling said second mounting element at one of a plurality of positions along a length of said drive assembly frame.

3. The wheelchair as defined in claim 2 wherein, said positioning structure includes a plurality of apertures extending through said second mounting element, 4. The wheelchair as defined in claim 1 wherein said wheelchair further includes:
   an anti-tip suspension assembly mounted to said drive assembly frame and extending rearwardly and downwardly therefrom to a position rearward of said power drive wheel and above the ground to prevent rearward tipping of said wheelchair.

5. A wheelchair comprising:
   wheelchair frame having a fore portion and an aft portion;
   a seat assembly carried by said wheelchair frame;
   a power drive assembly including a drive assembly frame, a motor mounted to said drive assembly frame, and power drive wheels mounted to said drive assembly frame and operably coupled to said motor;
   a drive assembly mounting structure releasably coupling said drive assembly frame to said wheelchair frame proximate said aft portion;
   a wheel mounting structure provided on said wheelchair frame and releasably receive a pair of manually-operable drive wheels for mounting to said wheelchair frame means when said power drive assembly is removed from said wheelchair frame; and
   an anti-tip suspension assembly mounted to one of said aft portion of said wheelchair frame and said drive assembly frame for preventing rearward tipping on said wheelchair, said anti-tip suspension assembly including a suspension are assembly, and a mounting structure pivotally mounting said arm assembly to said one of said wheelchair frame and said drive assembly frame, said arm assembly having a first arm portion extending away from said mounting structure, and ground engaging element provided on said first arm portion at a spaced distance from said mounting structure and in a normally elevated position above the ground, and said arm assembly further including pivotal motion resisting structure resisting pivoting of said first arm portion about said mounting structure when said wheelchair is tipped by an amount sufficient to cause said ground engaging element to move from said elevated position into contact with the ground.

6. The wheelchair as defined in claim 5 wherein, said pivotal motion resisting structure resists pivoting of said first arm portion about said mounting structure with a nonlinear resistance force.

7. The wheelchair as defined in claim 5 wherein, said pivotal motion resisting structure is provided by a second arm portion on said arm assembly coupled to said first arm portion.

8. The wheelchair as defined in claim 7 wherein, said second arm portion and said first arm portion extend away from said mounting structure and are formed to cooperatively engage each other to produce said nonlinear resistance force.

9. The wheelchair as defined in claim 8 wherein, said second arm portion is secured proximate a distal end thereof to said drive assembly frame and is further formed for resilient flexing thereof intermediate said distal end and said mounting structure to resiliently resist rotation of said first arm portion.

10. The wheelchair as defined in claim 9 wherein, said second arm portion is secured proximate said distal end for sliding translational movement.

11. The wheelchair as defined in claim 9 wherein, said first arm portion and said second arm portion are formed for cooperative engagement after a predetermined rotation of said first arm portion to progressively increase the resistance to further rotation of said first arm portion.

12. A wheelchair comprising:
    wheelchair frame having a fore portion and an after portion;
    a seat assembly carried by said wheelchair frame;
    a power drive assembly including a drive assembly frame, a motor mounted to said drive assembly frame, and at least one power drive wheel mounted to said drive assembly frame and operably coupled to said motor;
    a drive assembly mounting structure releasably coupling said drive assembly frame to said wheelchair frame proximate said aft portion for driving of said wheelchair as a powered wheelchair, said drive assembly mounting structure including a downwardly convergently tapered first mounting element carried by said wheelchair frame, and a downwardly convergently tapered second mounting element carried by said drive assembly frame, and fastener means releasably coupling said first mounting element to said second mounting element in mating nested engagement; and
    a wheel mounting structure provided on said wheelchair frame and formed to releasably receive a pair of manually-operable drive wheels for mounting to said wheelchair frame when said power drive assembly is removed from said wheelchair frame for operation of said wheelchair as a manually-powered wheelchair.

* * * * *

UNITED STATES PATENT AND TRADEMARK OFFICE
CERTIFICATE OF CORRECTION

PATENT NO. : 5,351,774

DATED : October 4, 1994

INVENTOR(S) : James Okamoto

It is certified that error appears in the above-identified patent and that said Letters Patent is hereby corrected as shown below:

Column 3, line 43, delete "best mode of carrying out and invention" and insert therefor --Best Mode of Carrying Out the Invention--;

Column 4, line 31, delete "O[THE" and insert therefor --OF THE--;

Column 8, line 31, delete "2441" and insert therefor --24"--;

Column 9, line 66, delete "am" and insert therefor --arm--; and

Column 13, Claim 5, line 66, delete "are" and insert therefor --arm--.

Signed and Sealed this

Twenty-ninth Day of November, 1994

Attest:

BRUCE LEHMAN

*Attesting Officer*      *Commissioner of Patents and Trademarks*